United States Patent

Kasznica

Patent Number: 5,209,008
Date of Patent: May 11, 1993

[54] WINGING MATERIAL FOR FISHING FLIES

[76] Inventor: John M. Kasznica, 84 Pleasant St., S. Weymouth, Mass. 02190-9998

[21] Appl. No.: 905,414

[22] Filed: Jun. 29, 1992

[51] Int. Cl.$^5$ .................................. A01K 85/00
[52] U.S. Cl. ............................. 43/42.53; 43/42.27
[58] Field of Search ............... 43/42.53, 42.25, 42.27, 43/42.24, 42.32; D22/130, 132, 128

[56] References Cited

U.S. PATENT DOCUMENTS

| | | | |
|---|---|---|---|
| D. 295,998 | 5/1988 | Moser | D22/132 |
| 2,209,096 | 7/1940 | Sherer | 43/42.25 |
| 2,350,572 | 6/1944 | Schweigert | 43/42.25 |
| 4,307,531 | 12/1981 | Honse | 43/42.24 |
| 4,411,089 | 10/1983 | Runeric | 43/42.53 |
| 5,003,722 | 4/1991 | Berkley et al. | 43/3 |
| 5,068,997 | 12/1991 | Shimazaki | 43/42.25 |

Primary Examiner—Richard K. Seidel
Assistant Examiner—Chuck Y. Mah

[57] ABSTRACT

A winging material system for fishing flies uses closed cell plastic foam attached to a fishing fly body. The wings or wing covers made thereof are septate due to the intrinsic characteristic of the closed cell structure of the said material. The cell septation, as it appears in thin section, simulates the appearance of wing veins of natural insect wings. The intrinsic buoyancy of the synthetic foam allows for the permanent floatation of dry flies, or for achieving buoyancy stabilization in sinking fishing flies. This material is transparent, translucent, opaque, white, or colored to simulate natural insect wing color, or to match any particular fishing fly pattern. The said material may be attached to the fly body by traditional fly tying methods, adhesives, bonding, and/ or heat sealing.

5 Claims, 1 Drawing Sheet

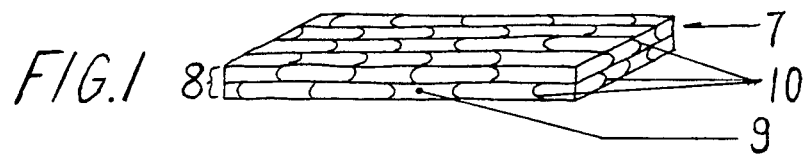
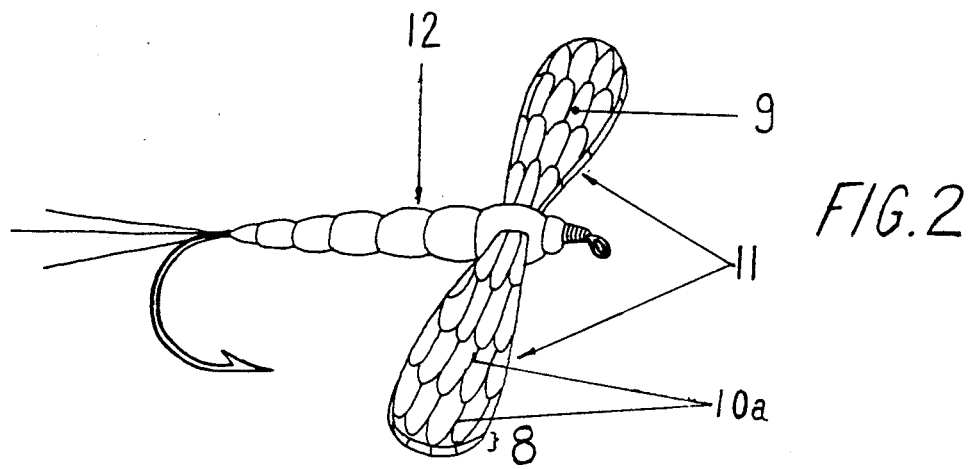
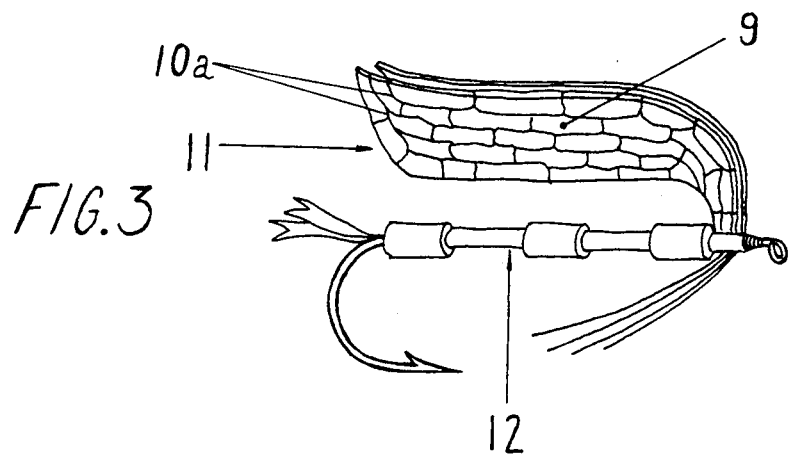
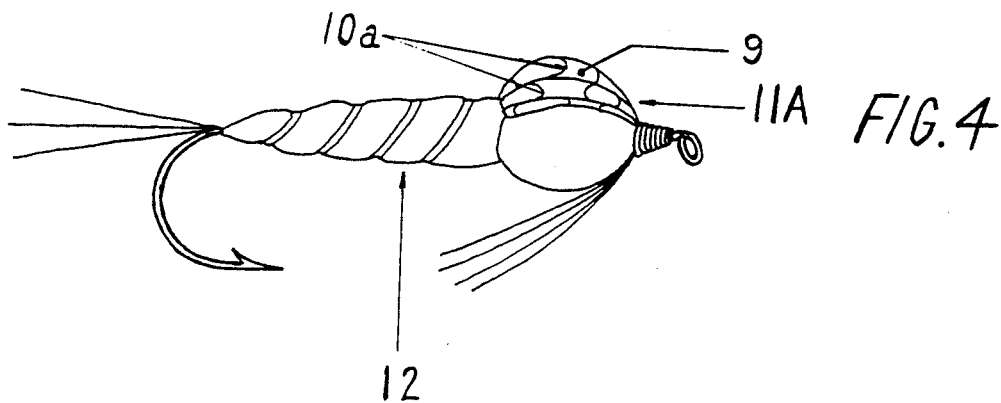

WINGING MATERIAL FOR FISHING FLIES

BACKGROUND OF THE INVENTION

1) Field of the Invention

The invention relates to fishing flies and materials used in the tying thereof.

It is a new application of the use of synthetic plastic closed cell foam materials for the purpose of making fishing fly wings and wing covers.

2) Description of the Prior Art

No prior art synthetic wings of this type and quality required for fishing flies are known. Many dry flies currently used require a floatant paste or dressing to keep them on the surface of the water.

Closed cell foams have been used as body materials in the construction of some fishing flies; example: foam hoppers, foam ants, inchworms, damselflies, and coffin flies. Reference: Orvis Company catalog, Vol. III, No. 1, pp. 41-48, 1991.

SUMMARY OF THE INVENTION

A novel winging material system, whereby fishing flies have wings or wing covers of closed cell polyethylene foam sheet or similar plastic foam material, which allows so constructed dry flies and floating nymphs to float even in fast moving waters.

Attached to wet flies or weighted nymphs the intrinsically buoyant foam material wings or wing covers stabilize so constructed flies to help maintain these flies in a more lifelike underwater position.

When the foam sheet is cut or otherwise rendered to a thickness of approximately one to three closed cells, the resulting wings made of this thin sheet mimic the veined wings of the natural insect, by virtue of the foam material's intrinsic cellular structural septation.

The synthetic foam utilized in this invention may be attached as the sole winging material, or can be an addition to other artificial or natural fly making materials.

The wings or wing covers made of said material can be affixed to the fly body by a variety of means, including: traditional fly tying methods, use of adhesives, heat sealing.

DESCRIPTION OF THE DRAWINGS

FIG. 1 is a perspective view of a thin closed cell foam wafer used in the making of synthetic wings and wing covers for fishing flies.

FIG. 2 is a perspective view of a sample dry fishing fly with synthetic closed cell foam wings attached thereon.

FIG. 3 is a perspective view of a sample wet fishing fly with synthetic closed cell foam wings attached thereon.

FIG. 4 is a perspective view of a sample fly fishing nymph with synthetic closed cell foam wing cover attached thereon.

DESCRIPTION OF THE INVENTION

Referring now to FIG. 1 a thin wafer 7 of closed cell plastic foam with a thickness 8 of approximately one to three closed cells obtained from a closed cell polyethylene foam sheet material 9. The said sheet has maximum cell size of up to 4 millimeters, density of 1.6-2.5 pcf cured, tensile strength of 55-75 psi, tearing strength of 17-20 lb/inch, tensile elongation of 55-87%. Colors of the said material are: transparent, translucent, opaque/white and colored.

Satisfactory results have been achieved in the present invention using Dow Chemical Company ETHAFOAM TM 221, ETHAFOAM TM 221 ANTI-STATIC SHEET and ETHAFOAM TM 222. Other foam materials with similar physicochemical and cell structural properties could be used with satisfactory results.

The wafer 7 of said material 9 is utilized as winging material for a variety of fishing flies FIGS. 2, 3, 4.

The thickness 8 of approximately one to three complete closed cells is considered optimal, allowing for the cell septa 10 to impart the desired optical effect, simulating natural wing venation 10a; simultaneously the closed cells impart a permanent buoyancy to the fishing flies, either, imparting permanent floatation to dry flies FIG. 2, or permanent underwater buoyancy stabilization to wet flies FIG. 3 or sinking nymphs FIG. 4. Therefore, it is obvious that thicker wafers of the said material 9 than those described as optimal increase the resulting wing bulkiness and buoyancy, but necessarily sacrifice the wing vein mimicking realism due to the undesirable superposition of additional layers of foam septa 10. The wafer 7 of said material 9 is shaped by hobby knife, razor, scissors, and/or by any other means that do not alter physico-chemical or cellular architectural properties.

The said material 9 selected for the making of fishing fly wings 11 or wing covers 11A is shaped according to the specifications of the particular pattern of the fishing fly being made, or, alternately, is shaped according to a natural insect wing model.

The said material 9 is compatible with other natural and synthetic fly tying materials and methods.

The said material 9 may be used as the sole winging material or may be used in conjunction with a plurality of synthetic and/or natural winging materials.

The wings 11 or wing covers 11A are attached to the fishing fly body 12 by a variety of means, including: conventional fly tying methods, cementing, bonding, glueing, molding, epoxy resin polymers, heat sealing or combinations thereof The wings 11 or wing covers 11A are attached to the fishing fly body 12 singly, in pairs, or multiples depending on the given fishing fly pattern specifications.

The said material 9 may be used to construct fishing flies based on traditional patterns.

The said material 9 may be used to construct novel fishing flies, the patterns of which are centered around the advantageous features of the present invention.

The advantages of the present invention are multifold: much improved wing realism over that of conventional fishing flies, permanent floatation in dry flies FIG. 2 even in the fast current of streams and rivers diminishing the need for floatant dressings; underwater buoyancy stabilization in wet flies FIG. 3 and nymphs FIG. 4 simulating the underwater position of natural insect nymphs and larvae; the durability of the said material is equal to or greater than that of conventional winging materials. The fishing flies FIGS. 2, 3, 4 having wings/wing covers 11,11A easily withstand repeated casting and fish strikes. The present invention holds the fishing flies realistically on the surface of the water, the near weightlessness of the foam wings 11, 11A does not interfere with precision casting and delicate fly presentations. Finally, the wings 11 and wing covers 11A can be made to precise specifications, uniform quality and at a low cost.

Subtle alterations of wing 11 dimensions affect the degree of surface floatation and surface film realism. Such alterations have been performed and tested successfully on several fishing fly prototypes.

Although but three embodiments of the present invention have been illustrated FIGS. 2, 3, 4 it will be apparent to those skilled in the art that the various changes and modifications and patterns may be made herein, without departing from the spirit of the invention.

I claim:

1. A method of assembling a fishing fly having a body portion and a wing portion, comprising the steps of:
    (a) providing a thin wafer of closed cell plastic foam material;
    (b) shaping said wafer to resemble a wing portion of a natural insect;
    (c) attaching said wind portion to a fishing fly body; wherein said wafer is a closed cell polyethylene foam sheet material having a density of 1.6–2.5 lb/cu.ft. and a thickness of one to three closed cells; said cell has a maximum cell size of up to 4 millimeters.

2. The method set forth in claim 1 wherein said wing portion is attached to a dry fishing fly or a wet fishing fly.

3. The method set forth in claim 1 wherein said wind portion is a wing cover of a nymph.

4. The method set forth in claim 1 wherein said closed cell foam is transparent or translucent, or opaque.

5. The method set forth in claim 1 wherein said wing portion is attached to said body by tying, bonding, gluing, heat-sealing or molding.

* * * * *

UNITED STATES PATENT AND TRADEMARK OFFICE
CERTIFICATE OF CORRECTION

PATENT NO. : 5,209,008
DATED : May 11, 1993
INVENTOR(S) : John M. Kasznica

It is certified that error appears in the above-indentified patent and that said Letters Patent is hereby corrected as shown below:

TITLE PAGE

[76] 84 Pleasant St., S. Weymouth, Mass. 02190-9998 should be corrected to:

10 Flintlock Circle, Hingham, Mass. 02043

CLAIMS

Column 4, Line 3 : wind should be corrected to: wing

Column 4, Line 11 : wind should be corrected to: wing

Signed and Sealed this

First Day of February, 1994

Attest:

BRUCE LEHMAN

Attesting Officer     Commissioner of Patents and Trademarks